3,255,225
OLEFIN POLYMERIZATION CATALYSTS
Arthur William Anderson, Windsor Hills, Del., and David Blodgett Ludlum, New York, N.Y., assignors to E. I. du Pont de Nemours and Company, Wilmington, Del., a corporation of Delaware
No Drawing. Filed Mar. 11, 1963, Ser. No. 264,038
6 Claims. (Cl. 260—448)

This application is a continuation-in-part of an earlier application, Serial No. 551,199, filed Dec. 6, 1955, and now abandoned.

This invention relates to the preparation of lithium aluminum trialkyl halides, to the use thereof in the formation of novel coordination polymerization catalysts and to the use of these catalysts in olefin polymerization processes.

Syntheses of both alkali metal and aluminum organometallic compounds are described in considerable detail in the art. Moreover, although there is recognition in the art that mixed alkali metal-aluminum organometallic coordination complexes may be formed by adding alkali metal compounds, especially salts, to organoaluminum compounds, this type of reaction is not available generally for the synthesis of all potential alkali metal-aluminum organometallic coordination complexes. For example, as noted by K. Ziegler in Section 5 of "Organometallic Chemistry," H. Zeiss, Reinhold Publishing Corp., 1960, page 200, aluminum triethyl adds to all alkali metal fluorides except lithium fluoride and to all alkali metal chlorides except lithium chloride and sodium chloride. Based on the art, therefore, it is obvious that the aforesaid synthetic method is inoperable for the preparation of lithium aluminum trialkyl fluorides or chlorides.

It is an object of the present invention to provide a process for the preparation of lithium aluminum trialkyl halides. It is a further object to provide lithium aluminum trialkyl chlorides which may be reacted with transition metal compounds to form coordination polymerizaiton catalysts. Another object is to provide coordination polymerization catalysts which are stereospecific in nature. A still further object is to provide a process for the polymerization of propylene to highly stereospecific polypropylene. Other objects will become apparent hereinafter.

The objects of the present invention are achieved by reacting, under an inert atmosphere, an approximately 3:1 molar ratio of an alkyl lithium organometallic with an aluminum trihalide, particularly aluminum trichloride, to form a lithium aluminum trialkyl halide and lithium halide. The organometallic compound so produced then may be reacted with an art-recognized reducible transition metal compound to form a novel stereospecific type coordination polymerization catalyst which is active for the polymerization of alpha-olefinic hydrocarbons. The reaction between the alkyl lithium and aluminum trichloride preferably takes place in an inert liquid medium, such as an inert hydrocarbon. Since the reaction takes place very readily at ordinary temperatures, no special precautions are needed to maintain temperature at a specific high or low level. It is preferable to employ temperatures within the range 0–100° C. In one suitable method of operation aluminum chloride is added slowly to a solution of an alkyl lithium and a liquid hydrocarbon under an inert atmosphere. The resulting precipitate of lithium aluminum trialkyl chloride is separated from the lithium chloride and liquid hydrocarbon and is resuspended in an inert liquid hydrocarbon for use in the subsequent formation of a coordination polymerization catalyst. The alkyl lithium compounds preferred in the present invention for the synthesis of the lithium aluminum trialkyl chlorides contain 3 to 5 carbon atoms as exemplified by n-propyl lithium, isopropyl lithium, n-butyl lithium, isobutyl lithium and n-pentyl lithium.

While the lithium aluminum trialkyl chlorides of the present invention may be reacted with a wide variety of transition metal compounds to form coordination polymerization catalysts, they preferably are reacted with a reducible compound of an element selected from the Group IV–B and Group V–B elements of the Periodic Chart of the Elements such as may be found on pages 448–9 of the Handbook of Chemistry and Physics, 41st edition, 1959. While the nature of the lithium aluminum trialkyl chlorides is such that when they are employed in conjunction with a variety of compounds of a transition metal of Group IV–B or Group V–B, they provide stereospecific type coordination polymerization catalysts, it is preferable to utilize the lithium aluminum trialkyl chlorides in conjunction with a compound, and preferably a halide, of one of the aforesaid Group IV–B elements which is in a valence state at least one below its maximum valence state or of one of the aforesaid Group V–B elements which is in a valence state at least two below its maximum valence state. Thus, while the organometallic of the present invention may be reacted with such transition metal compounds as titanium tetrachloride, vanadium tetrachloride, vanadyl trichloride, vanadyl dichloride and the like, it is preferable to utilize such transition metal compounds as titanium trichloride, titanium dichloride, vanadium trichloride, vanadium dichloride, vanadium monoxychloride and the like. If desired a compound wherein the transition metal is in its normal maximum valence state may be prereduced, preferably in an inert hydrocarbon diluent at temperatures above about 100° C., either with the lithium aluminum trialkyl chloride of the present invention or with any other reducing agent conventionally employed in the formation of coordination polymerization catalysts to form a more desirable transition metal compound wherein the metal is in the preferred reduced valence state.

While the coordination polymerization catalysts which are formed with the lithium aluminum trialkyl chlorides of the present invention are very active for the polymerization of alpha-olefinic hydrocarbons in general, because of their stereospecific nature they are especially suitable for the polymerization of substituted ethylenes which provide centers of asymmetry within the resultant polymer. In keeping therewith, the coordination polymerization catalysts produced herein are preferably utilized for the polymerization of olefinic hydrocarbons containing at least 3 but usually no more than 10 carbon atoms. As illustrative examples may be cited propylene, 1-butene, 1-pentene, 1-hexene, 3-methyl-1-butene, 4-methyl-1-pentene and the like. The polymerization of alpha-olefins in accordance with the present invention may be effected over a wide variety of conditions. Thus, the catalysts are active at 0–250° C. and from subatmospheric to superatmospheric pressures, for example 2,000 atmospheres and above. The polymerization may be carried out either in an inert hydrocarbon diluent or in the absence of a diluent such as by means of solid phase or fluidized bed polymerization techniques. The quantities of lithium aluminum trialkyl chloride and transition metal compounds used in the formation of the coordination polymerization catalysts are not unduly critical. Optimum activity of the catalysts of the present invention is obtained when the molar ratio of the organometallic component to the transition metal compound is maintained in the range of 0.5 to 10. Because of the high activity of the catalysts only small quantities need be employed. Preferred catalyst concentrations lie in the range 0.001–10 weight percent of monomer converted for batch-type polymerizations.

The formation of lithium aluminum trialkyl chlorides, the use thereof in the formation of coordination polymerization catalysts and the polymerization of alpha-olefins by means of these catalysts are illustrated by the following examples.

*Example I*

In a helium atmosphere 4.5 grams scraped Li was reacted with 25 ml. distilled isobutyl chloride in 100 ml. decahydronaphthalene. The product, which was a solution of isobutyl lithium admixed with Li and LiCl, was permitted to stand at 25° C. for 12 hours, after which the supernatant liquid was siphoned off. This liquid (81 ml.) was transferred under a helium atmosphere to a reaction vessel wherein it was admixed with 50 ml. of decahydronaphthalene. The isobutyl lithium content of the solution was determined by titrating an aliquot part with aqueous hydrochloric acid (found to be 1.4 molar before dilution with 50 ml. decahydronaphthalene, 0.87 molar after dilution). The calculated equivalent quantity of $AlCl_3$ (5.13 grams) was added to the isobutyl lithium slowly with stirring under an inert atmosphere. Stirring was continued at 20–30° C. until reaction was complete (stirring was continued an additional 16 hours). A very finely divided white precipitate appeared and settled out on standing. This powder was hydrocarbon-insoluble and had an analysis which indicated $LiAl(isobutyl)_3Cl$.

*Example II*

To demonstrate the utility of the $LiAl(isobutyl)_3Cl$ in the polymerization of ethylene, an experiment was performed as follows: 100 ml. decahydronaphthalene were heated to 100° C., and 49 micromols (one micromol being one millionth of a mol) $TiCl_4$ was added; this was admixed with 400 micromols $LiAl(isobutyl)_3Cl$ slowly over a two minute period to produce a dark colored catalyst mixture; ethylene was injected into this mixture at atmospheric pressure, the initial rate of absorption being 70 cc. per minute. After 100 minutes, 1250 ml. of ethylene had polymerized, and the rate of polymerization had dropped to 5 cc. per minute. The initial rate was thus several times as high as the initial rate of ethylene polymerization using a similar quantity of catalyst made from $Al(isobutyl)_3+TiCl_4$, instead of $LiAl(isobutyl)_3Cl+TiCl_4$ under the same conditions; and the rate after 100 minutes was also higher than the corresponding rate with $Al(isobutyl)_3+TiCl_4$ catalyst, the total quantity of polymer obtained being about twice as high with $LiAl(isobutyl)_3Cl+TiCl_4$ as with $Al(isobutyl)_3+TiCl_4$.

*Example III*

When $LiAl(isobutyl)_3Cl$, prepared as described in Example I, was reacted with $VCl_4$ to form an ethylene polymerization catalyst (20 micromols $VCl_4$ were admixed with 400 micromols $LiAl(isobutyl)_3Cl$ in 100 ml. decahydronaphthalene in an ethylene atmosphere at 100° C.), the resulting mixture was so extremely active that the rate of ethylene polymerization at atmospheric pressure was too fast to measure. The mixture absorbed ethylene very rapidly and became gelled with ethylene polymer.

*Example IV*

When $LiAl(isobutyl)_3Cl$, prepared as described in Example I, was reacted with $TiCL_4$ (to 196 micromols $TiCl_4$ was added slowly 1.6 millimols $LiAl(isobutyl)_3Cl$, in 100 ml. decahydronaphthalene in a propylene atmosphere at 25° C.), and the resulting catalyst was employed for polymerization of propylene at 25° C., atmospheric pressure, the initial rate of polymerization was 25 cc./minute; 750 cc. polymerized at 50 minutes, rate at 50 minutes being 13 cc. per minute. The resulting polypropylene had a melt index of 0.02. The rate of polymerization of propylene was much higher than with $Al(isobutyl)_3+TiCl_4$ under the same conditions, and the molecular weight of the product was also considerably higher using the $LiAl(isobutyl)_3Cl+TiCl_4$ catalyst.

*Example V*

Using the technique described in Example I except that distilled n-butyl chloride was used in place of the isobutyl chloride, a 1.55 molar solution of n-butyl lithium in decahydronaphthalene was prepared. To 190 ml. of this solution admixed with 100 mu. of decahydronaphthalene were added 13.4 grams of aluminum chloride slowly with stirring under an inert atmosphere. Stirring was continued at 20–30° C. until reaction was complete (stirring was continued an additional 16 hours). A very finely divided white precipitate of $LiAl(n-butyl)_3Cl$ appeared and settled out on standing. The supernatant was removed by means of a filter stick and the $LiAl(n-butyl)_3Cl$ was resuspended in 100 ml. of decahydronaphthalene.

*Example VI*

To demonstrate the utility of the organometallic compound prepared in Example V in the polymerization of propylene an experiment was performed as follows: 200 ml. of decahydronaphthalene were heated to 190° C. under an inert atmosphere of nitrogen, after which were added 2.0 millimols of $TiCl_4$, followed by 0.70 millimol of $Al(isobutyl)_3$. Heating at 190° C. was continued for 15 minutes after which time the purple slurry of $TiCl_3$ was cooled to 70° C. and saturated with propylene. Polymerization was initiated by adding 2.0 ml. of the slurry of $LiAl(n-butyl)_3Cl$ prepared in Example V. Propylene was passed through the reaction mixture during catalyst formation and for one hour thereafter at a temeprature of about 70° C. The polymerization then was terminated by adding 100 ml. of n-butyl alcohol. The polypropylene which was recovered using conventional techniques weighed 8.6 grams, had a density of 0.900 (A.S.T.M. test D–1505–57T) and a melt index of 1.9 (A.S.T.M. test D–1238–57T).

*Example VII*

A slurry of 2.0 millimols of $TiCl_3$ in 200 ml. of decahydronaphthalene was heated to 70° C. under an atmosphere of nitrogen. The mixture was saturated with propylene and polymerization was initiated by adding 2.0 ml. of the slurry of $LiAl(n-butyl)_3Cl$ prepared in Example V. After the polymerization was allowed to continue for about one hour, the propylene stream was discontinued and 100 ml. of n-butyl alcohol were added to the reaction mixture. The polypropylene which was recovered using conventional techniques weighed 2.3 grams, had a density of 0.898 and a melt index of 0.01.

*Example VIII*

Example VII was repeated using $VCl_3$ in place of the $TiCl_3$. The polypropylene recovered weighed 0.7 gram, had a density of 0.884 and a melt index of 0.23.

We claim:
1. A process which comprises admixing an alkyl lithium with an aluminum trihalide in an inert liquid hydrocarbon medium, and continuing the resulting reaction until a precipitate is formed, said precipitate being characterized in that it yields an effective ethylene polymerization catalyst when reacted with $TiCl_4$ in an inert hydrocarbon liquid medium at 100° C., said catalyst having a higher activity, measured in terms of initial ethylene polymerization rate at atmospheric pressure at 100° C., than catalyst made from trialkyl aluminum and titanium tetrachloride under the same conditions.

2. Process of claim 1 wherein the said alkyl groups in the alkyl lithium and $Al(alkyl)_3$ are all isobutyl groups.

3. A process for the preparation of lithium aluminum trialkyl halides which comprises contacting, under an inert atmosphere, an alkyl lithium and an aluminum trihalide in an inert liquid hydrocarbon medium and thereafter separating said lithium aluminum trialkyl halide from the reaction mixture.

4. A process for the preparation of lithium aluminum trialkyl chlorides which comprises contacting, under an inert atmosphere, at a molar ratio of about 3:1, an alkyl lithium and aluminum trichloride in an inert liquid hydrocarbon medium and thereafter separating said lithium aluminum trialkyl chloride from the reaction mixture.

5. A process for the preparation of lithium aluminum trialkyl chlorides, wherein said alkyl group contains 3 to 5 carbon atoms, which comprises contacting, under an inert atmosphere, at a molar ratio of about 3:1, an alkyl lithium containing 3 to 5 carbon atoms and aluminum trichloride in an inert liquid hydrocarbon medium and thereafter separating said lithium aluminum trialkyl chloride from the reaction mixture.

6. The process of claim 5 wherein said alkyl groups are isobutyl.

References Cited by the Examiner

UNITED STATES PATENTS

| | | | |
|---|---|---|---|
| 2,844,615 | 9/1953 | Ziegler et al. | 260—448 |
| 2,885,561 | 5/1959 | Reynolds et al. | 260—94.9 |
| 2,899,415 | 8/1959 | Truett | 260—94.9 |
| 2,904,542 | 9/1959 | Fasce et al. | 260—94.9 |
| 2,905,645 | 9/1959 | Andersen et al. | 252—429 |

OTHER REFERENCES

Finar: Organic Chemistry, vol. 1, Longmans, Green and Co., New York, 1954, p. 311.

JOSEPH L. SCHOFER, *Primary Examiner.*